(12) United States Patent
Griessbaum et al.

(10) Patent No.: US 10,866,134 B2
(45) Date of Patent: Dec. 15, 2020

(54) FILL LEVEL MEASUREMENT DEVICE HAVING OPTIMISED ENERGY CONSUMPTION

(71) Applicant: VEGA GRIESHABER KG, Wolfach (DE)

(72) Inventors: Karl Griessbaum, Muehlenbach (DE); Roland Welle, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 200 days.

(21) Appl. No.: 16/014,501

(22) Filed: Jun. 21, 2018

(65) Prior Publication Data

US 2018/0372528 A1    Dec. 27, 2018

(30) Foreign Application Priority Data

Jun. 21, 2017  (DE) .................. 10 2017 210 381
Jun. 21, 2017  (DE) .................. 10 2017 210 382
Jun. 21, 2017  (DE) .................. 10 2017 210 383
Jun. 21, 2017  (DE) .................. 10 2017 210 402
Jun. 21, 2017  (EP) ...................... 17177111
Jun. 21, 2017  (EP) ...................... 17177147

(51) Int. Cl.
*G01F 23/284*     (2006.01)
*G01S 7/40*        (2006.01)
(Continued)

(52) U.S. Cl.
CPC .......... *G01F 23/284* (2013.01); *G01S 7/4008* (2013.01); *G01S 13/88* (2013.01);
(Continued)

(58) Field of Classification Search
None
See application file for complete search history.

(56) References Cited

U.S. PATENT DOCUMENTS 4,503,433 A   3/1985  Tomasi
4,661,817 A   4/1987  Bekkadal et al.
(Continued)

FOREIGN PATENT DOCUMENTS

DE    694 33 175 T2   6/2004
DE    102009057191 A1  6/2011
(Continued)

OTHER PUBLICATIONS

T. Saito, et al., "An FM-CW radar module with front-end switching heterodyne receiver", IEEE MTT-S Digest, T-2, vol. 2, XP032363243A, 1992, pp. 713-716.
(Continued)

*Primary Examiner* — Paresh Patel
(74) *Attorney, Agent, or Firm* — Obion, McClelland, Maier & Neustadt, L.L.P.

(57) ABSTRACT

A FMCW fill level radar device including a control circuit for temporarily shifting, during the measuring phase, one component of the transceiver circuit into a state having reduced power consumption, resulting in the measurement being interrupted. This results in the total power consumption of the fill level radar device being reduced such that energy can be accumulated in the device, after which the measuring phase is continued.

16 Claims, 5 Drawing Sheets

(51) Int. Cl.
  *G01S 13/88* (2006.01)
  *H01Q 1/22* (2006.01)
  *H01Q 13/02* (2006.01)

(52) U.S. Cl.
  CPC ............ *H01Q 1/225* (2013.01); *H01Q 13/02* (2013.01); *G01S 2007/4013* (2013.01)

(56) References Cited

U.S. PATENT DOCUMENTS

| | | | |
|---|---|---|---|
| 4,847,623 | A | 7/1989 | Jean |
| 5,406,842 | A | 4/1995 | Locke |
| 5,440,310 | A | 8/1995 | Schreiner |
| 5,629,706 | A | 5/1997 | Bååth |
| 6,122,602 | A | 9/2000 | Michalski |
| 6,486,826 | B1 | 11/2002 | Cramer |
| 6,684,696 | B2 | 2/2004 | Schultheiss |
| 6,864,833 | B2 | 3/2005 | Lyon |
| 7,363,812 | B2 | 4/2008 | Eriksson |
| 7,460,057 | B2 | 12/2008 | Fehrenbach |
| 8,276,444 | B2 | 10/2012 | Malinovskiy |
| 8,319,680 | B2 | 11/2012 | Sai |
| 8,497,799 | B2 | 7/2013 | Kleman |
| 8,872,694 | B2 | 10/2014 | Edvardsson et al. |
| 9,291,443 | B2 | 3/2016 | Kleman et al. |
| 9,329,074 | B2 | 5/2016 | Sai |
| 9,389,113 | B2 | 7/2016 | Jirskog et al. |
| 9,395,229 | B2 | 7/2016 | Jirskog et al. |
| 9,506,796 | B2 | 11/2016 | Edvardsson |
| 9,541,444 | B2 | 1/2017 | Kleman |
| 9,793,951 | B2 | 10/2017 | Henry |
| 10,260,928 | B2 | 4/2019 | Welle |
| 10,310,056 | B2 | 6/2019 | Hughes |
| 10,416,021 | B2 | 9/2019 | Gorenflo et al. |
| 10,422,682 | B2 | 9/2019 | Hengstler |
| 10,473,509 | B2 | 11/2019 | Hengstler |
| 2005/0052314 | A1 | 3/2005 | Spanke et al. |
| 2005/0168379 | A1* | 8/2005 | Griessbaum ............ G01S 13/10 342/124 |
| 2006/0044145 | A1 | 3/2006 | Akerstrom |
| 2008/0282793 | A1 | 11/2008 | Jirskog |
| 2009/0033543 | A1 | 2/2009 | Nilsson |
| 2011/0163910 | A1 | 7/2011 | Sai |
| 2011/0248725 | A1 | 10/2011 | Mukherjee |
| 2012/0130509 | A1 | 5/2012 | Altendorf |
| 2012/0169528 | A1 | 7/2012 | Edvardsson |
| 2012/0242530 | A1 | 9/2012 | Luebbert et al. |
| 2012/0299767 | A1 | 11/2012 | Kleman |
| 2012/0299768 | A1 | 11/2012 | Griessbaum |
| 2013/0213132 | A1 | 8/2013 | Wegemann |
| 2014/0253147 | A1 | 9/2014 | Kleman et al. |
| 2014/0253366 | A1 | 9/2014 | Kleman |
| 2014/0298885 | A1 | 10/2014 | Criel et al. |
| 2015/0116142 | A1 | 4/2015 | Jirskog |
| 2015/0160066 | A1* | 6/2015 | Sai ........................ G01S 13/26 342/21 |
| 2015/0177163 | A1 | 6/2015 | Edvardsson |
| 2015/0253176 | A1 | 9/2015 | Jirskog et al. |
| 2015/0276462 | A1 | 10/2015 | Kleman |
| 2015/0338261 | A1 | 11/2015 | Mueller |
| 2016/0103006 | A1 | 4/2016 | Edvardsson |
| 2016/0115784 | A1 | 4/2016 | Littleford et al. |
| 2016/0146658 | A1 | 5/2016 | Littleford |
| 2018/0031687 | A1* | 2/2018 | Mueller .................. G01S 7/034 |
| 2018/0164145 | A1 | 6/2018 | Daufeld et al. |
| 2018/0262319 | A1 | 9/2018 | Xing |
| 2018/0328771 | A1 | 11/2018 | Edvardsson |
| 2020/0249068 | A1 | 8/2020 | Michalski |

FOREIGN PATENT DOCUMENTS

| | | |
|---|---|---|
| DE | 10 2015 109 463 A1 | 12/2016 |
| EP | 0 928 974 A2 | 7/1999 |
| EP | 1 707 982 A1 | 10/2006 |
| EP | 1 707 983 A1 | 10/2006 |
| EP | 1 992 923 A2 | 11/2008 |
| EP | 2 166 671 A2 | 3/2010 |
| EP | 2 293 096 A2 | 3/2011 |
| EP | 2 631 612 A2 | 8/2013 |
| EP | 2 491 355 B1 | 12/2017 |

OTHER PUBLICATIONS

U.S. Office Action dated Jul. 9, 2020 in co-pending U.S. Appl. No. 16/008,456 (15 pgs.)

Office Action dated Apr. 15, 2020 in U.S. Appl. No. 16/011,274, 13 pages.

Office Action dated May 15, 2020 in U.S. Appl. No. 16/014,501; 9 pages.

Office Action dated Sep. 22, 2020 in co-pending U.S. Appl. No. 16/011,274; 13 pgs.

Office Action dated Oct. 6, 2020 in co-pending U.S. Appl. No. 16/014,680; 11 pgs.

Office Action dated Aug. 28, 2020 in U.S. Appl. No. 16/014,634, 23 pgs.

* cited by examiner

FILL LEVEL MEASUREMENT DEVICE HAVING OPTIMISED ENERGY CONSUMPTION

CROSS-REFERENCE TO RELATED APPLICATIONS

This application claims the benefit of the filing date of European Patent Applications No. 17 177 111.6 filed on 21 Jun. 2017 and No. 17 177 147.0 filed on 21 Jun. 2017, the entire contents of each of which are hereby incorporated herein by reference and of German Patent Applications No. 10 2017 210 383.3 filed on 21 Jun. 2017, No. 10 2017 210 381.7 filed on 21 Jun. 2017, No. 10 2017 210 382.5 filed on 21 Jun. 2017 and No. 10 2017 210 402.3, filed on 21 Jun. 2017, the entire contents of each of which are hereby incorporated by reference.

FIELD

The embodiments relate to fill level measurement. The embodiments relate in particular to a fill level radar device, to a method for fill level determination, to a program element and to a computer-readable medium.

BACKGROUND

The fill level of filling materials can be determined in various ways. Fill level measurement devices are known which determine the fill level from the delay time of electromagnetic waves that are transmitted by the measurement device and are re-received after being reflected by the filling material. The delay time of the waves allows the distance between the measurement device and the filling material to be ascertained and, from said distance, a filling state or filling level of a container fitted with the measurement device can be ascertained in turn.

The electromagnetic waves may be high-frequency waves or microwaves. The waves may be freely emitted by the measurement device towards the filling material or, alternatively, they may be directed back and forth by a waveguide.

When using radar fill level sensors, which are hereinafter also referred to as fill level radar devices, it is often the case that the energy or power for powering the sensor is limited by external circumstances. Limited energy is available if the sensor is powered by an energy storage device having a finite capacity, for example a battery or accumulator. It is also very often the case that a radar fill level sensor is operated as a so-called two-wire sensor. This means that the measurement device is both supplied with energy by a single pair of wires, known as a two-wire line, and also sends the measured value to an external device via said pair of wires. In this case, the measured value is sent for example via the current flowing in the line, a current flow between 4 mA and 20 mA being a very common standard. Experts often also use the term "4 . . . 20 mA two-wire line" in this connection. This results in the available power usually being very severely restricted, for example to values which, in the worst case, can be significantly below 100 mW.

It is therefore important not only to construct the sensor in such an energy-efficient manner that it is capable of carrying out a measurement under these conditions, but also to optimise the measurement device in such a way that the available energy can be utilised as effectively as possible. This can lead to an increase in the measuring rate, for example.

SUMMARY

The present disclosure describes providing a fill level radar device characterised by energy-efficient operation.

The described embodiments, together with further advantages, will be best understood by reference to the following detailed description taken in conjunction with the accompanying drawings. A described embodiment relates to a fill level radar device comprising a signal source arrangement or circuit, a transceiver circuit and a control circuit. The signal source arrangement is used to generate a stepped electromagnetic transmission signal at a frequency that is constant in portions, wherein the individual frequencies of the stepped transmission signal are distributed within a defined frequency band. This distribution is equidistant, for example, and therefore the frequency hops between the individual steps are always the same. The transceiver circuit is used to transmit the transmission signal towards the filling material during the measuring phase of the fill level radar device, to receive the transmission signal reflected by the filling material surface, and to mix the received reflected transmission signal with a second signal in order to produce an intermediate frequency signal, from which the fill level can be determined. During the measuring phase, the control circuit is used to temporarily shift at least one component of the transceiver circuit into a state having reduced power consumption, resulting in the measurement being interrupted.

A measuring phase or measuring cycle may start at the time at which the signal source starts to generate the stepped electromagnetic transmission signal and the transceiver circuit starts to transmit the transmission signal towards the filling material. The measuring phase may stop when all data required for fill level determination has been acquired, i.e., when the device is ready to determine the fill level. Interruption of the measuring phase may occur not only before the PLL has reached its locked state, but also during transmission of the stepped transmission signal, thereby interrupting the transmission.

In this way, the power consumption of the fill level radar device can be temporarily reduced during the measuring phase, which makes it possible for the radar device to accumulate energy in order to continue the measurement in the measuring phase once enough new energy has been accumulated.

For example, the transceiver circuit can be configured to heterodyne the received reflected transmission signal with the second signal. Heterodyning means that two different signal source arrangements are provided, which make it possible for the signals from different signal source arrangements to be used to generate the intermediate frequency signal. In contrast, what is known as homodyning involves mixing two signals coming from the same signal source or signal source arrangement. This involves, for example, the transmission signal, which is supplied directly to the mixer by the signal source arrangement, and the reception signal, which is the transmission signal reflected by the filling material.

According to a further embodiment, the transceiver circuit is configured to homodyne the received reflected transmission signal with the second signal.

According to a further embodiment, the component that is temporarily shifted into the state having reduced power consumption during the measuring phase is a transmission amplifier, an intermediate frequency amplifier, a quadrature demodulator, a reception mixer, an analogue-to-digital converter or an element of the transmission branch, for example a transmission signal amplifier. The phase-locked loop, if provided, can continue to be operated in any case, since it uses relatively little energy.

The above-mentioned measuring phase is the period of time during which the stepped transmission signal is generated and emitted. The duration of the measuring phase thus substantially corresponds to the duration of the frequency sweep.

It should be noted at this juncture that it is not only a single component that can be temporarily shifted into the state having reduced power consumption; rather, this may be a plurality of components or even the whole transceiver circuit.

The state having reduced power consumption is an idle state or stand-by mode, for example. In addition, the state having reduced power consumption may be brought about by switching off the supply voltage of the component in question.

According to a further embodiment, the control circuit is configured, before the temporary shifting of the component of the transceiver circuit into the state having reduced power consumption, to determine a currently available amount of energy in the fill level measurement device and/or to determine the currently available power therein, and to trigger the temporary shifting only if the available amount of energy or the available power falls or has fallen below a predetermined threshold value.

Furthermore, the control circuit can be configured to shift the component back into an operating state if the available amount of energy and/or available power exceeds or has exceeded a second predetermined threshold value.

In the simplest case, the two threshold values are identical. However, the second threshold value may be above the first threshold value, and so, in other words, a measurement is continued only when a very significant amount of energy has been accumulated.

According to a further embodiment, the control circuit is configured to trigger the temporary shifting of the component of the transceiver circuit into the state having reduced power consumption during a tuning phase of the transceiver circuit to a new frequency value. This can be in addition to the above-described measures with respect to falling below the threshold value and helps to save additional energy.

A further described embodiment relates to a method for fill level determination, in which a stepped electromagnetic transmission signal is generated at a frequency that is constant in portions, wherein the individual frequencies are distributed within a defined frequency band. The transmission signal is transmitted during a measuring phase towards a filling material surface, is reflected there and is subsequently re-received by the measurement device. The received reflected transmission signal is then mixed with a second signal in order to produce an intermediate frequency signal, from which the fill level can be determined. During the measuring phase, one component of the transceiver circuit is temporarily shifted into a state having reduced power consumption, resulting in the measurement being interrupted. It may be the case that a measurement signal is not emitted during this temporary state having reduced power consumption, which also saves energy.

The features described above and in the following with respect to the fill level measurement device may be implemented in the method as method steps, and the method steps described in the following may be implemented in the measurement device.

A further described embodiment relates to a program element which, when executed on a processor of a fill lever radar device, prompts the fill level radar device to carry out the steps described above and in the following.

A further described embodiment relates to a computer-readable medium on which the above-described program element is stored.

Embodiments are described in the following with reference to the drawings. In the following description of the drawings, like reference signs denote like or similar elements. The views in the drawings are schematic and not to scale.

BRIEF DESCRIPTION OF THE FIGURES

Embodiments are described in the following with reference to the drawings. In the following description of the drawings, like reference signs denote like or similar elements. The views in the drawings are schematic and not to scale.

DETAILED DESCRIPTION OF EMBODIMENTS

Figure 1:
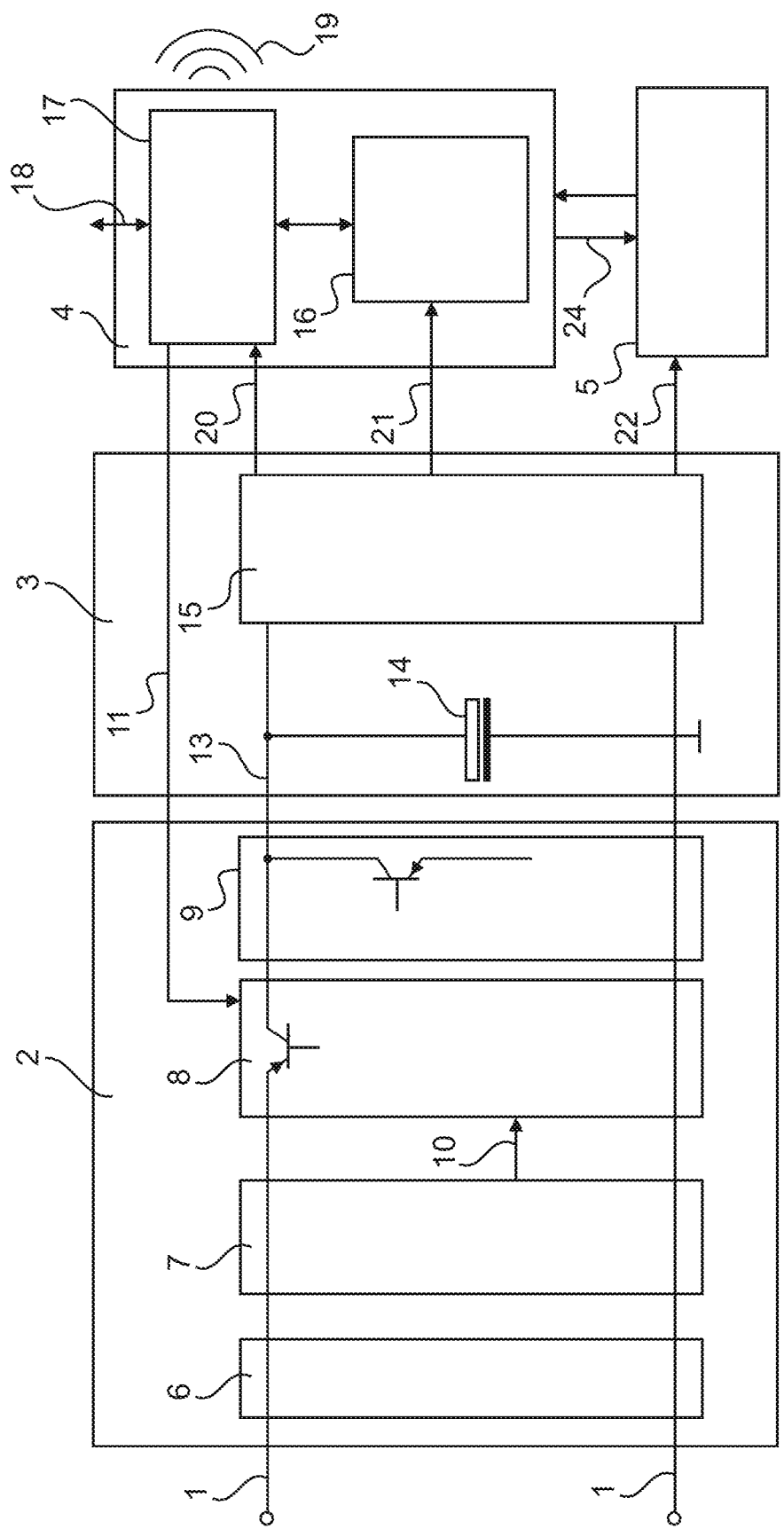
FIG. 1 shows the basic structure of a fill level radar device.

FIG. 1 shows the basic structure of a radar fill level sensor. In this case, this is what is known as a two-wire radar sensor, which is both supplied with energy by the two-wire loop 1, and also sends the measured value externally. In the present block diagram, said sensor is initially divided up into its four essential blocks: two-wire interface 2, power supply unit 3, control and measured-value-processing circuit 4 and transceiver circuit 5.

The two-wire interface 2 contains an EMC filter circuit 6 for filtering out interfering signals, a current-sensing circuit 7 for determining the current currently flowing in the current loop, a current-regulating circuit 8 and a shunt circuit 9. The current-regulating circuit 8 compares the actual value 10 of the regulation that is currently recorded by the current-sensing circuit 7 with the target value 11 provided by the control and measured-value-processing circuit 4, and regulates the loop current, for example by means of a transistor connected in series, such that the target and actual values match. The current flowing at the output 13 of the current regulator 8 powers the power supply unit 3, the current being divided into charging current for the energy storage device 14 and operating current for the DC-DC converter 15. If the energy storage device 14 is fully charged and less power is momentarily required by the DC-DC converter 15 than the two-wire loop at the sensor is providing, the residual current flows back through the shunt circuit 9 to the source (not shown).

The control and measured-value-processing circuit 4 controls the measuring sequence within the sensor, ascertains a measured value in the form of a filling level of a container from the sensor signals from the transceiver circuit 5, and communicates the measured value externally. For this purpose, said circuit contains a controller circuit 16, which is referred to above and hereinafter as a controller, processor or control circuit, and a communication and interface circuit 17. The controller circuit 16 consists for example of a microcontroller having corresponding peripheral equipment. The communication and interface circuit 17 delivers the measured value to be output, in analogue or digital form, as a target value 11 to the current-regulating circuit 8, and can also comprise various other channels 18, 19 in order to communicate with people or other devices. This can occur both in a wired manner 18 and also by radio 19.

The transceiver circuit 5 contains all the microwave circuits required to transmit and receive the high-frequency electromagnetic waves of the radar sensor. Said circuit also contains circuit components in order to process and transform the reception signal to such an extent that said signal is available in digital form for the signal processing by the controller circuit 16. The controller circuit 16, for its part, controls the transceiver circuit 5 by repeatedly initiating, controlling and analysing individual measuring cycles, and finishes by updating the measured value.

All the components of the control and measured-value-processing circuit 4 and of the transceiver circuit 5 of the radar sensor are powered by regulated output voltages 20, 21, 22 of the DC-DC converter 15.

Figure 2:
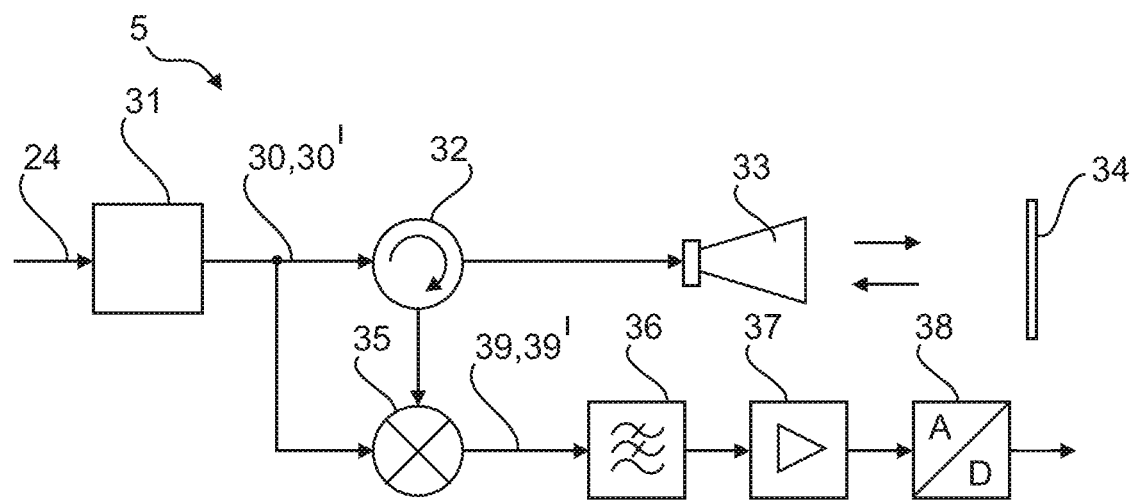
FIG. 2 is a block diagram of a transceiver circuit.
Figure 4:
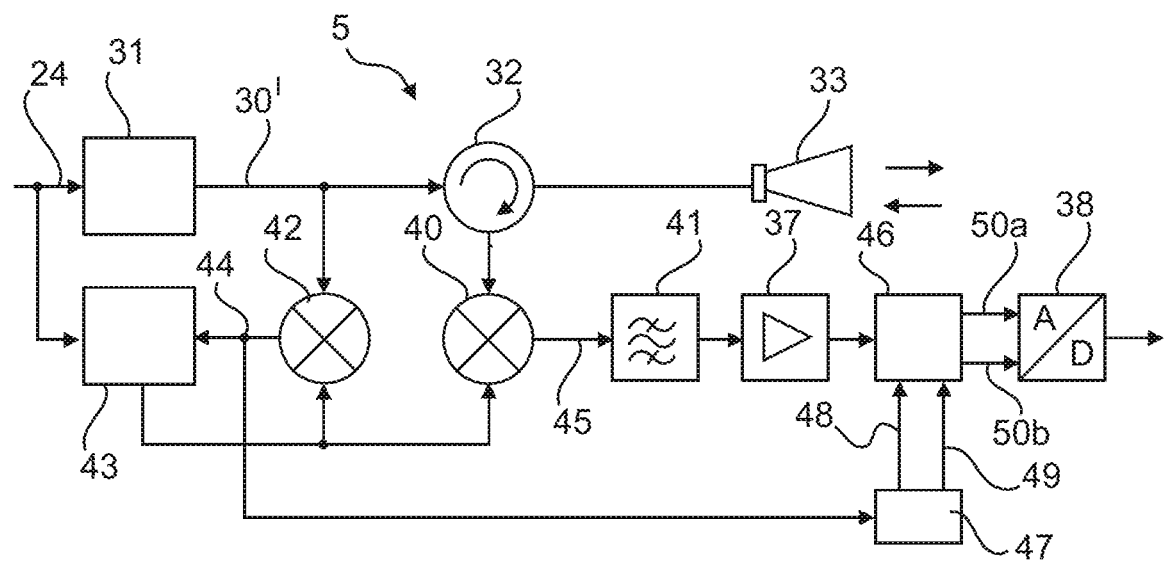
FIG. 4 is a block diagram of a further transceiver circuit.

FIG. 2 and FIG. 4 are block diagrams of transceiver circuits 5 which can alternatively be used in the radar fill level sensors (fill level radar devices) described herein. Said circuits contain partly identical or similar components, which are therefore provided with identical reference signs.

Various measuring methods are known for measuring the delay time of electromagnetic waves between transmission and receipt. In principle, it is possible to distinguish between methods which measure the delay time of very short transmission pulses, usually referred to as pulse radar, and measuring principles based on the modulation of continuously transmitted signals. These methods, known as CW (continuous wave) radar, involve constant transmission throughout a measuring process, whereby, compared with the pulse method, the transmission duration within a measuring cycle is typically longer, by orders of magnitude, than the delay time of the signals.

By modulating the transmission and reception waves, the delay time can be indirectly determined in the process. In FMCW methods (FMCW: frequency-modulated continuous wave), a linear or stepped-linear frequency modulation is used for this purpose. FIG. 2 is a highly simplified block diagram showing the basic structure of a transceiver circuit 5 of an FMCW radar sensor.

Figure 3:
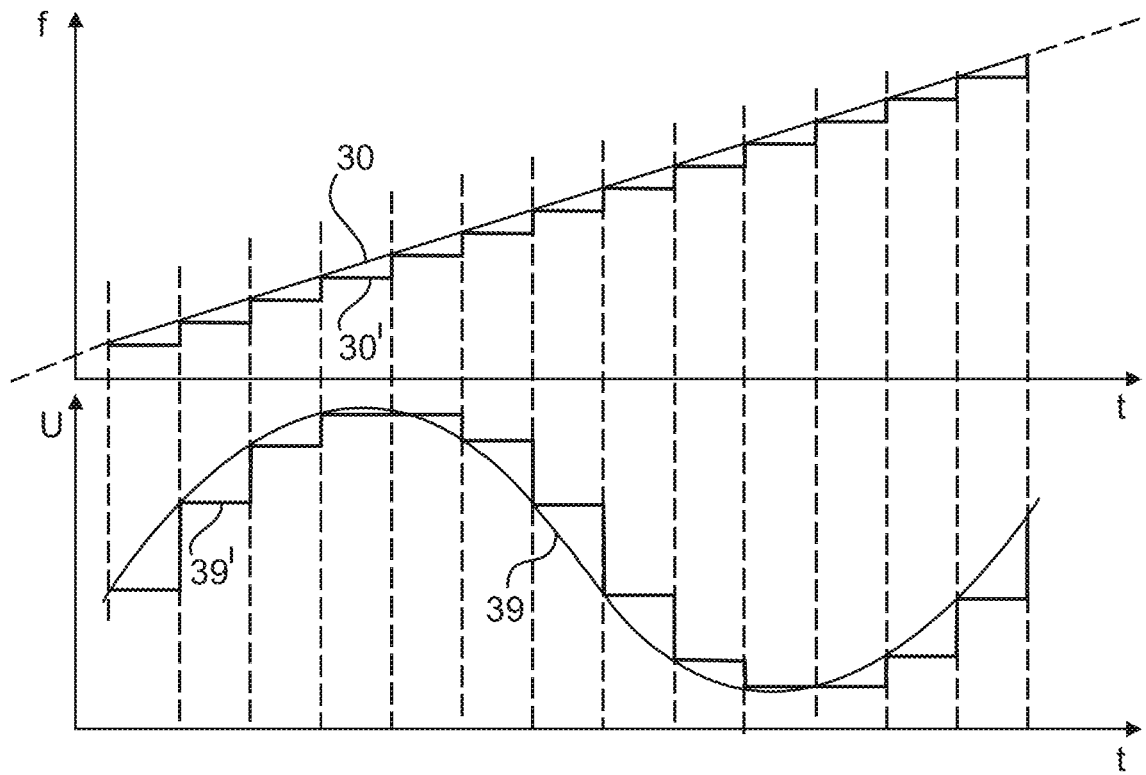
FIG. 3 shows two examples of a transmission signal and two examples of an intermediate frequency signal.

The synthesiser 31 is used to generate the transmission signal 30, and contains for example a VCO (voltage controlled oscillator) for this purpose. The transmission signal is frequency-modulated in a linear or stepped-linear manner by means of a circuit, contained in the synthesiser 31, for controlling the transmission frequency, for example a PLL circuit (PLL: phase locked loop). Said transmission signal 30 reaches the antenna 33 via the circulator 32, and is transmitted by said antenna towards a reflector 34. The reception signal returning to the antenna 33 following the reflection reaches the mixer 35 via the circulator 32. Said mixer mixes the reception signal with part of the transmission signal, resulting in what is known as a beat signal 39. After low-pass filtering in the filter 36 and appropriate amplification in the amplifier 37, said beat signal is digitalised by an analogue-to-digital converter 38 and is further digitally processed thereafter. Mixing the transmission signal and the reception signal is in this case what is known as a homodyne receiver principle. The distance of the reflector 34 from the measurement device has a direct impact on the frequency of the beat signal 39, for which reason, conversely, the measurement distance can be directly deduced from the measured beat frequency. A plurality of reflectors results in a beat signal 39 having a frequency mix made up of the individual frequencies associated with the various measurement distances. It is therefore usual for the digitalised beat signal to undergo spectral analysis using Fourier transformation, for example fast Fourier transformation (FFT), in order to separate the individual frequency components or reflection components and optionally to precisely define said portions in terms of the frequency thereof and thus the underlying measurement distance. FIG. 3 shows a portion of the transmission signal 30 having the linear frequency modulation in a time-frequency graph and shows, by way of example directly therebelow in a time-voltage graph, an associated analogue beat signal 39 which occurs at a defined reflector distance.

A variant of the FMCW method is the modification of the linear frequency modulation of the transmission signal into stepped-linear frequency modulation, as shown in FIG. 3 as an alternative 30'. In this case, the transmission signal 30' remains at a specific frequency for a certain period of time, and then hops to the next frequencies in even steps. On account of the homodyne mixing according to the block diagram from FIG. 2, which is also applicable here, DC voltage occurs at the mixer output for each frequency step, which voltage results from the mutual phase shift of the transmission signal and the reception signal. The DC voltages resulting from each step result, in succession, in a signal curve 39' that corresponds to the beat frequency 39 of the previously described FMCW method. This is also shown in FIG. 3 as a portion. As is clear from the figure, the previously continuous beat signal 39 is converted into a stepped analogue signal 39'. In the case of a subsequent analogue-to-digital conversion of said stepped signal 39', it is naturally expedient to convert exactly one sample value per step, meaning the digitalised beat signal of the stepped-linear frequency modulation does not substantially differ from the digitalised beat signal of a standard FMCW method. The further digital signal processing, beginning with the Fourier transformation, is therefore identical in both methods.

Although fill level measurement devices based on the above-mentioned methods for measuring the delay time of electromagnetic waves are well-developed and energy-efficient, improvements are nevertheless possible. These could relate to improved utilisation of the limited available energy.

FIG. 4 shows a block diagram of a measuring method that is an alternative to the above-described FMCW method. This differs from the transceiver circuit 5 shown in FIG. 2 by, inter alia, a heterodyne circuit design that provides a reception mixture of the received signal with a local oscillator signal having a variable frequency, resulting in an intermediate frequency at the mixer output.

Just as in FIG. 2, a transmission signal is generated by the synthesiser 31 and is directed via the circulator 32 or directional coupler 32 to the antenna 33, and emitted thereby. In the process, the antenna 33 converts a high-frequency signal supplied via a line into an electromagnetic wave, which is either freely emitted or, alternatively, is guided via a waveguide, for example a hollow conductor or a single-wire or multi-wire conductor, towards the reflector. At least part of the wave reflected by the reflector arrives back at the antenna 33 and is converted back into a conducted reception signal. Said signal then reaches the reception mixer 40 via the circulator or directional coupler 32. The circulator or directional coupler 32 is an element that is known in the field of radar fill level measurement and can advantageously be used in a monostatic operation, i.e. when using the same antenna for transmitting and receiving. Said circulator or coupler has at least three ports and directionally guides signals from one port primarily to a second port, while the third port is decoupled in this case. In a bistatic operation, which is also possible but is not shown here in more detail, two separate antennas are used for transmitting and receiving. In this case, the circulator or directional coupler 32 is omitted, and the signal reaches the transmission antenna via the synthesiser 31, and the reception mixer 40 via the reception antenna.

The synthesiser 31 is used to generate various sinusoids at varying frequencies in a pre-established frequency band, the frequency remaining at a fixed value for a certain period of time and then hopping to a new fixed frequency value. This can occur in the form of stepped-linear frequency modulation, for example. For this purpose, the synthesiser contains a tuneable oscillator, for example a VCO. In addition, it advantageously contains a regulation loop and a reference oscillator. The regulation loop, for example a phase-locked loop (PLL), regulates the frequency of the tuneable oscillator such that said frequency is in a defined, adjustable relationship with respect to the frequency of the reference oscillator. The frequency relationships are advantageously adjusted digitally, for example in a controlled manner by the controller circuit 16 by means of the signal 24, and this adjustment usually signifies switching one or more divider modules, which divide the frequency of the reference oscillator and/or of the tuneable oscillator. In this case, in addition to simple integer dividers, non-integer dividers, so-called fractional-n dividers, are also possible. Using dividers of this kind makes it possible to adjust the output frequency of the synthesiser 31 in very fine steps over a relatively large frequency range.

Part of the output signal of the synthesiser 31 is diverted, for example via a power splitter (not shown in more detail) or coupler, in order to produce the local oscillator signal for the reception mixer 40. For this purpose, the diverted synthesiser signal is mixed by the mixer 42 with an output signal of a second synthesiser 43, meaning that various new frequency components, such as the sum frequency and the difference frequency, result from the two input frequencies.

Said second synthesiser 43 is in principle made up of the same functional units as the synthesiser 31 which has already been described. As a regulation variable of the (phase-locked/) regulation loop, it is not the output frequency of the synthesiser 43, but the mixer output signal 44 of the mixer 42 that is used to produce the difference frequency between the two synthesiser signals. Said difference frequency is therefore corrected by the regulation loop of the synthesiser 43 to a pre-established value, which is either stored permanently in the PLL/regulation loop of the synthesiser 43 or is programmed therein by the controller circuit 16.

The output signal of the synthesiser is used as a local oscillator signal for the heterodyne reception mixing in the reception mixer 40.

In the reception mixer 40, inter alia the difference frequency results from the local oscillator signal and the reception signal and therefore corresponds exactly to the frequency of the frequency-regulated signal 44. Said output signal of the reception mixer 41, referred to as the intermediate frequency signal 45, has, in addition to the above-mentioned fixed frequency, a phase position which, together with the amplitude of the intermediate frequency signal, defines a complex parameter of the reflection coefficients of all reflectors involved in reflecting the wave. Or, in other words, the phase position of the intermediate frequency signal is dependent on the reciprocal phase position of the local oscillator signal and the reception signal. The phase position of the reception signal, for its part, is dependent on the distance travelled by the transmitted or received wave, and therefore on the reflector distance, whereas the phase position of the local oscillator signal is dependent on the synthesiser output signal, and therefore on the transmitted signal. The phase position of the intermediate frequency signal is therefore ultimately dependent only on the phase shift between the transmission signal and the reception signal, and therefore on the reflector distance.

Said intermediate frequency signal is band-filtered in the band filter 41 and amplified in the intermediate frequency amplifier 37 in order to increase the signal-to-noise ratio. In order to determine the complex reflection coefficients from the analogue intermediate frequency signal, the intermediate frequency signal can be broken down into its complex parts, i.e. the real and the imaginary part, by using a quadrature modulator 46, and the two components can separately undergo an analogue-to-digital conversion thereafter. For this purpose, another part 48 of the signal 44 and also a signal 49 that is phase-shifted by 90° with respect to said signal 48 are additionally intended to be supplied to the quadrature modulator 46, both of which signals are generated in the phase shifter 47. The advantage of using the quadrature modulator is that the real and the imaginary part of the intermediate frequency signal are present as baseband signals 50a, 50b, i.e. there are no longer any high frequency components, and digitalisation is thus very simple.

As already suggested, the measured values are further processed in the controller circuit 16 after the analogue-to-digital conversion by the analogue-to-digital converter 38. In addition to program code for analysing the digitalised measurement signals, the circuit part 16 also contains in particular program code for sequence control of a measuring cycle, i.e. for initiating the transmission of the waves and for controlling the frequencies, and for the general control of the transceiver circuit 5.

The circuit arrangement shown in FIG. 4 allows, as described, the determination of a complex reflection coefficient at a specific output frequency of the synthesiser 31. Said complex reflection coefficient is made up of all the reflection components contained in the received signal. If a plurality of reflectors are involved, the individual signal components can no longer be separated, and it is not possible to determine the distance of the individual reflectors. If this measurement is repeated at additional set output frequencies within a specific frequency band, a digital value table can be drafted, however, which consists of the set frequency values and the associated complex reflection coefficients. Advantageously, the frequency intervals between all the frequency values are selected so as to be equal, such that the frequency values divide the frequency band up into equidistant portions. This results in the band-limited spectrum of the digital reflection coefficients, which is subsequently subject to inverse Fourier transformation, for example subject to IFFT (inverse fast Fourier transformation) in the case of equidistant frequency intervals, which transforms the frequency signal into a time signal. Said digital time signal is in turn representative of the sum of the reflections of the transmitted and re-received measurement signal. The digital time signal is present in the form of a value table of time values and associated reflection components, and can be analysed in terms of ascertaining local maxima. Said local maxima characterise the individual reflections of the various reflectors which have been received according to the allocated time. In this form, this time/reflection-amplitude value table is now equivalent to the digitalised reflection profiles that are common in known fill level radar methods. Further analysis steps for determining the sought-after echo of the fill level surface and the determination of the exact reflection time of said echo can therefore be adopted from the known methods of pulse radar or FMCW radar systems. For example, it is advantageous in the case of a filling material container that is as empty as possible to store the reflections that are present as what are known as interference echoes in order to thus make it easier to identify the echo of the filing material surface.

It should be noted in general that the block diagrams are reduced to the essential components, and some of the components required for the practical implementation have not been shown or have been simplified, since they are known to a person skilled in the art. This involves filtering measures at the output of the mixer, for example, in order to let only the desired mixer frequencies through and to suppress undesirable mixing products. In addition, it is commonplace for a person skilled in the art to amplify signals as needed at different points in the signal chain in order to increase the signal-to-noise ratio. This could involve amplifiers in the transmission branch or in the reception branch upstream of the reception mixer. In addition, only the part of the sensor circuit that is significant for the direct measurement technology has been shown in this case. A fill level radar sensor built according to this principle can of course contain further circuit parts that are known to a person skilled in the art.

As already explained in the introduction, it can sometimes be the case with respect to radar fill level sensors that, in the case of a two-line power supply, the power flowing in is less than the power actually required by the sensor. In order to cover such a deficit, it is generally known to use an energy storage device 14. The additional energy from the storage device 14 has to be sufficient in order to cover a period of increased power demand in which it is not possible to temporarily reduce said demand. This is the case for example throughout the transmission of the electromagnetic wave, which, in conventional CW radar methods, can be relatively long and cannot be interrupted. This means there is often the need for a large energy storage device, which is correspondingly expensive and requires a lot of space.

In the method described here, however, the storage device size can be significantly reduced if, in each case before switching to a new frequency portion, the current energy reserve is checked and a measurement pause is introduced if a value is too low. In this context, a measurement pause means that although the synthesiser 31 is tuned to a new frequency value, the transmission signal is not yet transmitted and the entire receiver chain is shifted into an energy-efficient idle mode. As a result, the current total power demand of the sensor falls below the value of the supplied power. In this case, the energy that is not used flows into the energy storage device 14, which is thus recharged. If a defined voltage threshold of the storage device is not reached, the measuring cycle is continued with the transmission of the wave. Therefore, in contrast with other fill level sensors, the measurement can be easily interrupted if the status of the energy storage device is checked in the transition phase from one transmission frequency to the next, for example on the basis of the storage device voltage. Upon falling below a pre-established value, the transmission is continued only if a second pre-established value is exceeded again.

Figure 5:
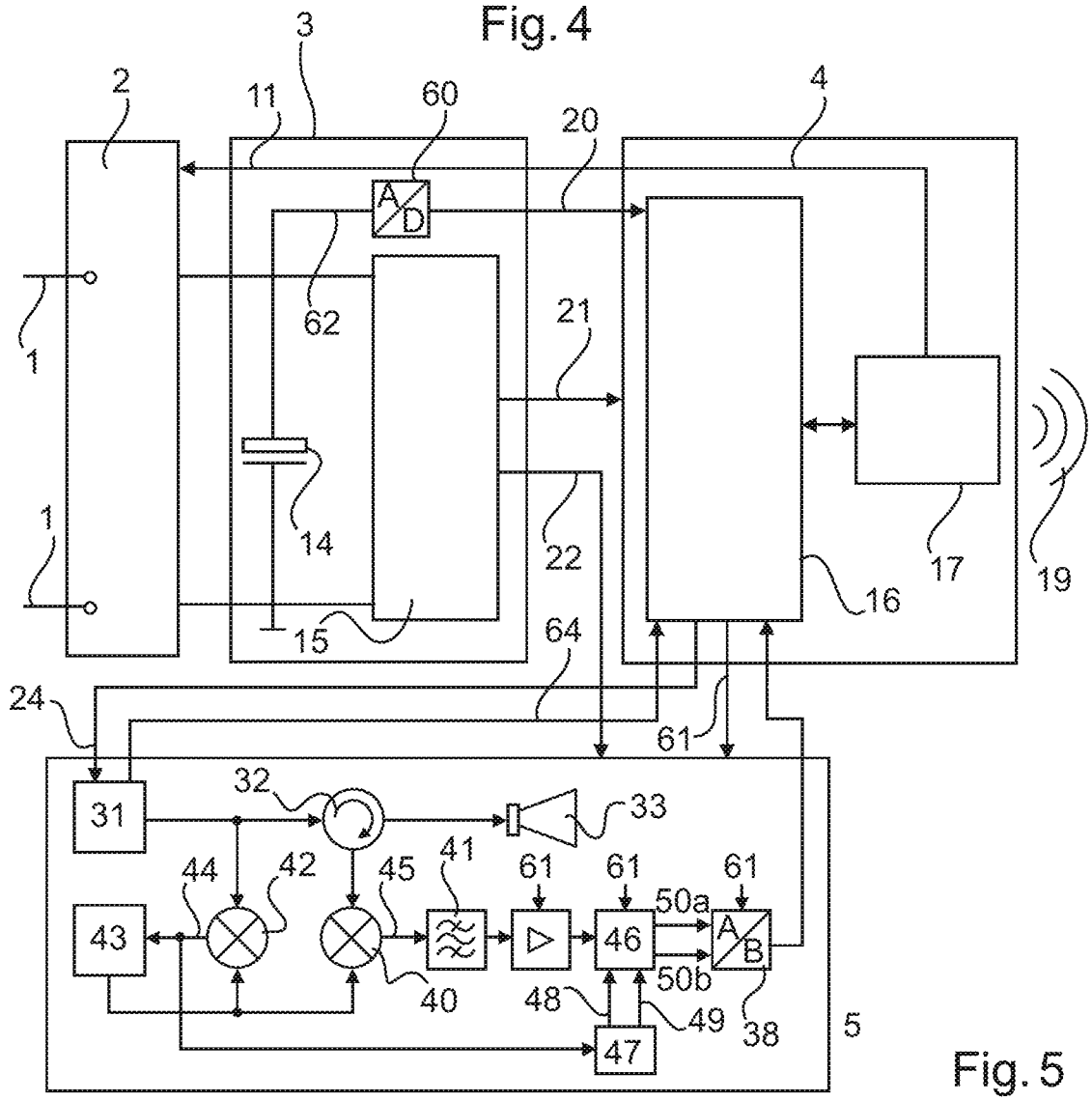
FIG. 5 is a block diagram of a fill level measurement device according to one embodiment.

FIG. 5 is a block diagram of a correspondingly modified measurement device for implementing the above-described method. The diagram contains circuit parts that are broadly equivalent to those shown in the block diagram in FIG. 1 and which have correspondingly equivalent reference signs. The difference lies in the fact that the controller 16 receives information regarding the charging status of the energy storage device 14. In the example shown, this occurs by analogue-to-digital conversion of the voltage at the energy storage device 14 by means of an analogue-to-digital converter 60. Alternatively, comparators are also possible for monitoring any number of thresholds for the storage device voltage, the digital output signal of which comparators can be read in via digital inputs of the controller circuit 16. Knowing the charging status of the energy storage device makes it possible to configure the measuring sequence of a measuring cycle by means of the controller 16 such that the available energy can be utilised as effectively as possible. At the same time, however, the capacity of the intermediate energy storage device 14 may be smaller than has hitherto conventionally been used, as a result of which space and costs can be reduced. In the case of other generic measurement devices and methods, it is not possible to interrupt the FMCW frequency sweep of a measuring cycle, since this would immediately impact on the beat signal as an interference effect that need not be corrected. Since all components of the transceiver circuit 5 are active during the frequency sweep, the total power demand is correspondingly at its maximum and usually exceeds the input power that is actually available. These gaps in power are compensated for by energy from the intermediate storage device 14. However, the lower the voltage at the storage device 14 falls, as a result of the discharge, compared with the sensor input voltage or the voltage at the two-wire loop 1, the greater the drop in voltage in the two-wire interface 2, which in turn results in power loss, which reduces effectiveness. Therefore, in order to minimise the drop in voltage at the storage device, it has hitherto been possible only to have the storage device be appropriately large, which, as already stated, has a negative impact in terms of cost and required space.

It is therefore proposed for the storage device voltage to be monitored by the controller and for a measurement pause to be introduced at a pre-established discharge level in order to thus temporarily reduce the total power demand and recharge the intermediate energy storage device. Said measurement pause, which is now also required and possible, especially during the sweeping period, makes it possible to effectively utilise energy while at the same time having a small energy storage device.

As set out above, the measurement pause is characterised in that the power consumption is significantly reduced. For this purpose, the controller 16 has to be able to switch specific components of the transceiver circuit into a state having reduced power consumption. This occurs for example by means of a switch signal 61 that is output by the controller and influences various components of the transceiver circuit 5 such that the corresponding circuit part is deactivated in some way. This involves the intermediate frequency amplifier 37, the quadrature modulator 46 and the analogue-to-digital converter 38, for example. In principle, deactivation of all the components of the transceiver circuit 5 is possible, it being important to consider, however, whether a deactivation is worthwhile, what reactivation time is potentially required and what additional circuit complexity this implies. In the simplest case, the supply voltage of one component is switched off. Many components also have what are known as enable inputs, however, and can be switched thereby into power-saving idle states. Circuit parts having digital circuitry components even provide, to an extent, digital interfaces via which the controller can communicate with the circuit component and can activate the idle state by means of a digitally transmitted command.

Figure 6:
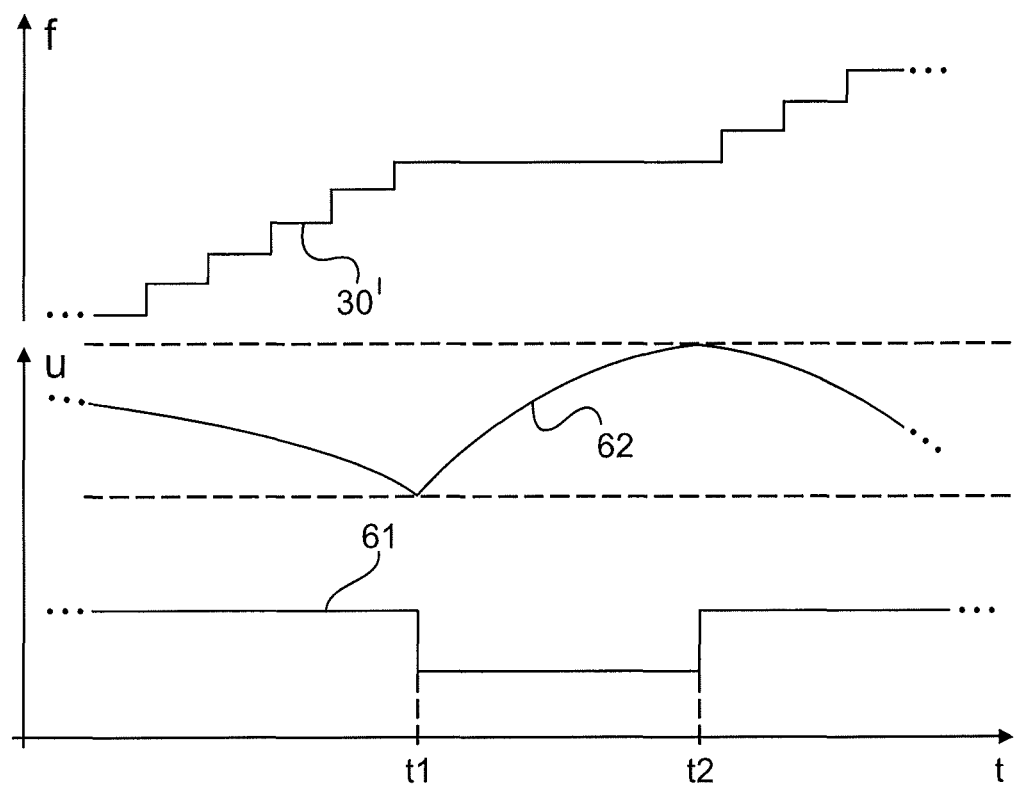
FIG. 6 shows examples of signal curves.

FIG. 6 shows examples of signal curves of signals from the circuit in FIG. 5 when applying the method according to one embodiment. The output signal 30' of the synthesiser 31, applied to the frequency axis, the voltage 62 at the intermediate energy storage device 14 and the activation signal 61 are plotted over a common time axis.

As already explained in connection with FIG. 3 by way of introduction, the frequency sweep is stepped. The controller controls the synthesiser via the connection 24 in defined steps from an initial frequency (not shown) to a defined, end frequency (not shown either). FIG. 6 shows only a portion of this time period, which is referred to as a sweep or measuring cycle, having only a few frequency steps. A total number in the range of from 100 to over 1000 frequency steps is usually used. A measured value in the form of a voltage value of the beat signal or a value of a reflection coefficient is usually ascertained for each frequency step. Since initially all components of the transceiver circuit are active, the voltage 62 at the energy storage device steadily drops. At the time t1, the controller identifies that the voltage has fallen below a pre-established threshold and thus switches the output signal 61 thereof from active to inactive. This results in some components of the transceiver circuit being deactivated, as a result of which the storage device voltage 62 recovers again. After exceeding a second, higher threshold, the controller decides at the time t2 that the measuring cycle can now be continued, and resets the control signal 61 to active. This results in the measuring sequence that was begun previously being continued.

A further possibility for reducing the power demand of the transceiver circuit 5 is the general deactivation of specific circuit parts as the synthesiser is tuned to a new frequency value. For this purpose, the synthesiser delivers an output signal 64, for example, that indicates whether or not the regulation loop thereof is precisely tuned or not. If a new frequency value of a step is specified for the synthesiser 31, this usually lasts for a certain time, until the regulation loop has stabilised at the new value. Circuit parts are thus activated or deactivated in response to said output signal. Said circuit parts may be, for example, a transmission amplifier (not shown), reception amplifier 37, reception mixer 40, reception filter 41, quadrature detector 46 and an analogue-to-digital converter 38.

It should be noted at this juncture that circuit parts are activated in response to a tuning signal from the synthesiser, and said circuit parts are deactivated in particular at time intervals within the sweep.

Figure 7:
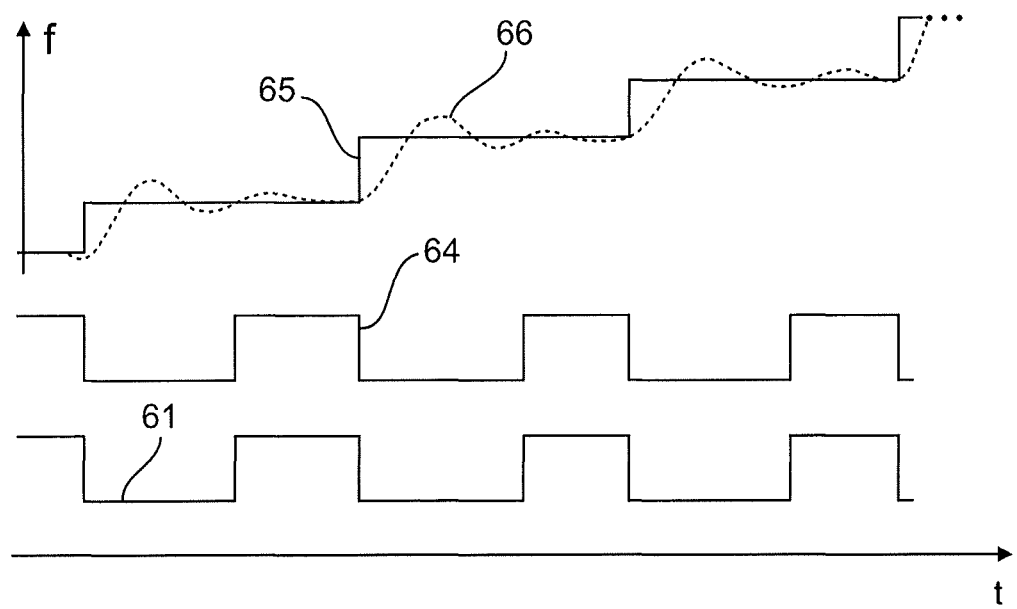
FIG. 7 shows further examples of signal curves.

FIG. 7 shows examples of signal curves of signals from the circuit in FIG. 5 when applying the proposed method. The output signal of the synthesiser 31, applied to the frequency axis, the tuning signal 64 of the synthesiser 31 and the activation signal 61 are again plotted over a common time axis. With respect to the output signal of the synthesiser 31, the signal curves of the ideal 65 and the real frequency curve 66 are applied. Ideally, the signal quickly hops from one step to the next. In reality, however, the signal requires a certain amount of time for transitioning to the next step, and the regulation responsible therefor can be responsible for diminishing regulation overshoots, potentially resulting in a signal curve similar to that of the graph 66. In this case, the regulator of the phase-locked loop registers a current, greater deviation from the target value and signalises this in the form of the low level of the tuning signal 64. Specific components of the transceiver circuit are activated by means of the activation signal 61 only when it is identified that the phase-locked loop is tuned. A measured value is generated after activation. Afterwards, the corresponding components are immediately deactivated again and the hop to the next frequency step is triggered by the generation of a new frequency target value. Since the activation time always lasts for exactly the same time as the time taken to generate the individual measured value, but the tuning time may well differ, the time intervals of the individual steps may also vary in length.

Alternatively, it is also possible to omit the tuning signal and to ascertain an empirical value for tuning the frequency regulation loop. This may be independent of the frequency difference between the two steps, for example. Using said empirical values, the controller can establish the time between a hop and the activation of the components, and can generate a corresponding control signal.

It should also be noted that the methods in FIG. 6 and FIG. 7 can advantageously be combined.

In a preferred embodiment of the method, the measuring sensitivity can be increased, without significant time losses, by the complex reflection coefficient being measured not only once per frequency step, but several times. From the plurality of measured values, a mean value is subsequently produced for the absolute value and the phase, or for the real and the imaginary part, as a result of which the signal-to-noise ratio is increased. In contrast with other methods, the mean values are not produced in this case using measured values that come from one measuring cycle after another, but from a plurality of measured values in a single measuring cycle. This is advantageous in that the time for tuning each frequency step appears only once for all the input values of the averaging, and time is therefore saved in comparison with the prior art.

Figure 8:
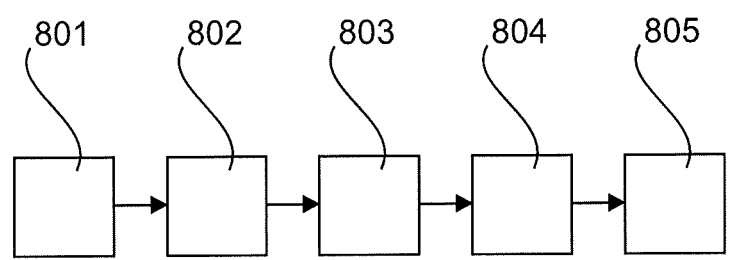
FIG. 8 is a flow chart of a method according to one embodiment.

FIG. 8 is a flow chart of a method according to one embodiment. Step 801 begins with a stepped electromagnetic transmission signal being generated at a frequency that is constant in portions. The generated part of the transmission signal is then transmitted towards a filling material surface, is reflected there and is re-received by the measurement device. In step 802, the received signal is mixed with a further signal in order to produce an intermediate frequency signal, from which the fill level can be determined. While the transmission signal is produced, at least one component of the fill level measurement device is temporarily, i.e. during the measuring phase, shifted into a state having reduced power consumption (step 803), resulting in the measurement ultimately being interrupted. This shift is triggered by the measurement device establishing that there is no longer sufficient energy for carrying out the entire measuring phase. Further energy is accumulated in step 804, and the component is "activated" again in step 805, i.e. shifted into its operating state, such that the measurement can continue, meaning that further steps of the transmission signal are produced, which are then emitted, reflected, received and mixed.

The method can in particular comprise the following steps:
1. Consecutive transmission of a plurality of electromagnetic waves in a measuring cycle (sweep) at a plurality of defined, partially fixed frequencies within a defined frequency band, wherein the individual frequencies are distributed over the band;

2. Heterodyne or homodyne reception mixture of the reflected and re-received signals in order to produce a reflection-dependent reception signal;
3. Filtering and amplification of the reflection-dependent reception signal;
4. Analogue-to-digital conversion;
5. Digital signal processing in order to produce a digital time- or frequency-based reflection profile;
6. Analysing the reflection profile in order to identify the reflection by the filling material surface;
7. Determining the delay time value of the filling material reflection and converting the time value into a reflector distance on the basis of the known wave propagation speed;
8. Calculating a value for the filling level from the known container height, the distance of the sensor from the container and the previously determined reflector distance;

This involves at least one component of the transceiver circuit being deactivated for a certain period of time during the measuring phase.

For the sake of completeness, it should be noted that "comprising" and "having" do not exclude the possibility of other elements or steps, and the indefinite articles "a" or "an" do not exclude the possibility of a plurality. It should further be noted that features or steps described with reference to one of the above embodiments may also be used in combination with other features or steps of other above-described embodiments. Reference signs in the claims should not be treated as limiting.

The invention claimed is:

1. A fill level radar device, comprising:
a signal source arrangement configured to generate a stepped electromagnetic transmission signal at a frequency that is constant in portions, wherein individual frequencies are distributed within a defined frequency band;
a transceiver circuit configured to transmit the stepped electromagnetic transmission signal towards a filling material surface during a measuring phase, to receive the stepped electromagnetic transmission signal reflected by a filling material surface, and to mix the received reflected stepped electromagnetic transmission signal with a second signal in order to produce an intermediate frequency signal from which a fill level can be determined; and
a control circuit configured to temporarily shift, during a measuring phase, one component of the transceiver circuit into a state having reduced power consumption, resulting in measurement being interrupted.

2. The fill level radar device according to claim 1, wherein the transceiver circuit is configured to heterodynly mix the received reflected transmission signal with the second signal.

3. The fill level radar device according to claim 1, wherein the one component that is temporarily shifted into the state having reduced power consumption during the measurement phase is a transmission amplifier, an intermediate frequency amplifier, a quadrature modulator, a reception mixer, or an analogue-to-digital converter.

4. The fill level radar device according to claim 1, wherein the state having reduced power consumption is brought about by switching off a supply voltage of the one component.

5. The fill level radar device according to claim 1, wherein the state having reduced power consumption is brought about by shifting the one component into an idle state.

6. The fill level radar device according to claim 1, wherein the control circuit is configured, before the temporary shifting of the one component of the transceiver circuit into the state having reduced power consumption, to determine a currently available amount of energy or power in the fill level radar device and to trigger the temporary shifting when an available amount of energy or an available power falls below a first predetermined threshold value.

7. The fill level radar device according to claim 6, wherein the control circuit is configured to shift the one component back into an operating state when the available amount of energy or the available power exceeds a second predefined threshold value.

8. The fill level radar device according to claim 1, wherein the control circuit is configured to trigger the temporary shifting of the one component of the transceiver circuit into the state having reduced power consumption during a tuning of the transceiver circuit to a new frequency value.

9. A method for fill level determination, comprising:
generating a stepped electromagnetic transmission signal at a frequency that is constant in portions, wherein an individual frequencies of are distributed within a defined frequency band;
transmitting the stepped electromagnetic transmission signal towards a filling material surface during a measuring phase;
receiving the stepped electromagnetic transmission signal reflected by a filling material surface;
mixing the received reflected stepped electromagnetic transmission signal with a second signal in order to produce an intermediate frequency signal from which a fill level can be determined; and
temporarily shifting, during a measuring phase, one component of a transceiver circuit into a state having reduced power consumption, resulting in measurement being interrupted.

10. A non-transitory computer-readable medium storing a program element that when executed by a processor causes the processor to be configured to implement a method for fill level determination, comprising:
generating a stepped electromagnetic transmission signal at a frequency that is constant in portions, wherein a individual frequencies of are distributed within a defined frequency band;
transmitting the stepped electromagnetic transmission signal towards a filling material surface during a measuring phase;
receiving the stepped electromagnetic transmission signal reflected by a filling material surface;
mixing the received reflected stepped electromagnetic transmission signal with a second signal in order to produce an intermediate frequency signal from which a fill level can be determined; and
temporarily shifting, during a measuring phase, one component of a transceiver circuit into a state having reduced power consumption, resulting in measurement being interrupted.

11. The fill level radar device according to claim 2, wherein the one component that is temporarily shifted into the state having reduced power consumption during the measurement phase is a transmission amplifier, an intermediate frequency amplifier, a quadrature modulator, a reception mixer, or an analogue-to-digital converter.

12. The fill level radar device according to claim 2, wherein the state having reduced power consumption is brought about by switching off a supply voltage of the one component.

13. The fill level radar device according to claim 2, wherein the state having reduced power consumption is brought about by shifting the one component into an idle state.

14. The fill level radar device according to claim 2, wherein the control circuit is configured, before the temporary shifting of the one component of the transceiver circuit into the state having reduced power consumption, to determine a currently available amount of energy or power in the fill level radar device and to trigger the temporary shifting when an available amount of energy or an available power falls below a first predetermined threshold value.

15. The fill level radar device according to claim 14, wherein the control circuit is configured to shift the one component back into an operating state when the available amount of energy or the available power exceeds a second predefined threshold value.

16. The fill level radar device according to claim 2, wherein the control circuit is configured to trigger the temporary shifting of the one component of the transceiver circuit into the state having reduced power consumption during a tuning of the transceiver circuit to a new frequency value.

* * * * *